Patented Aug. 16, 1949

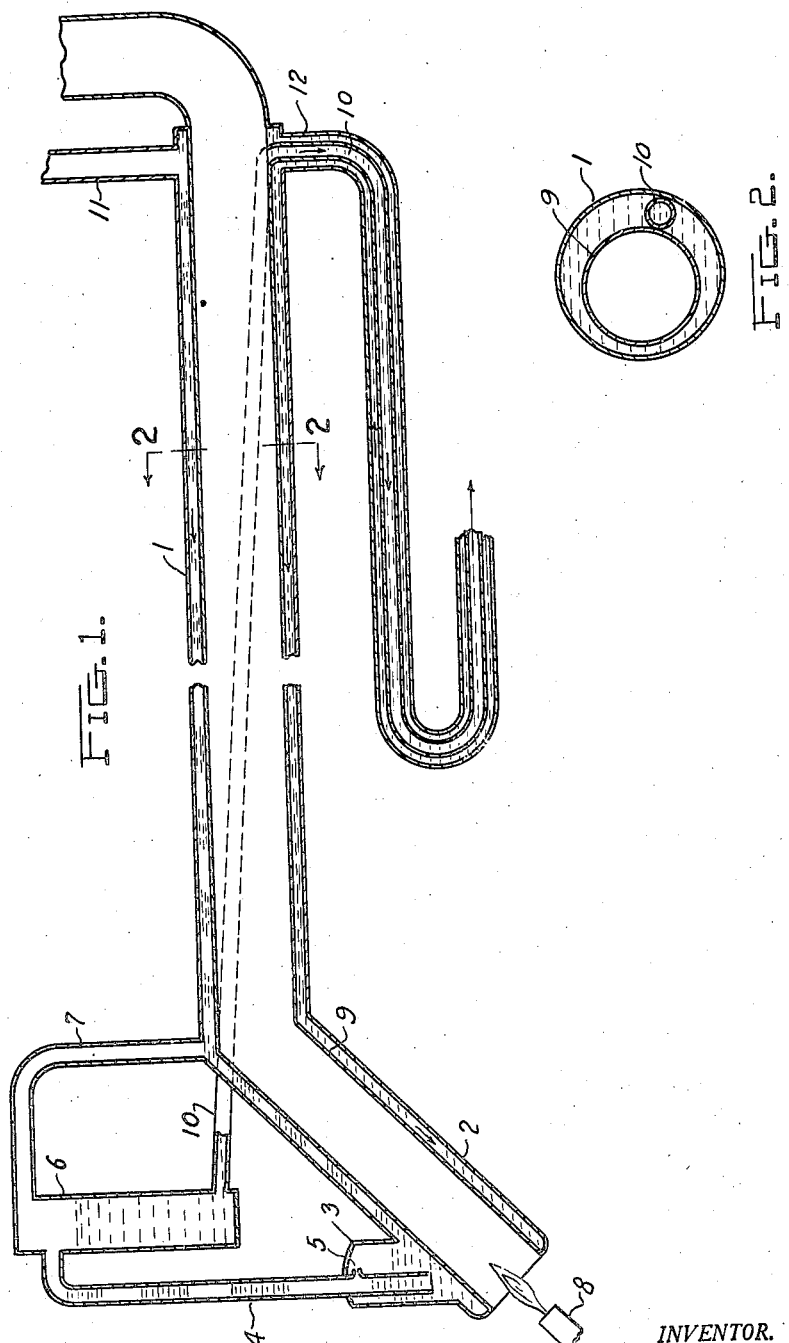

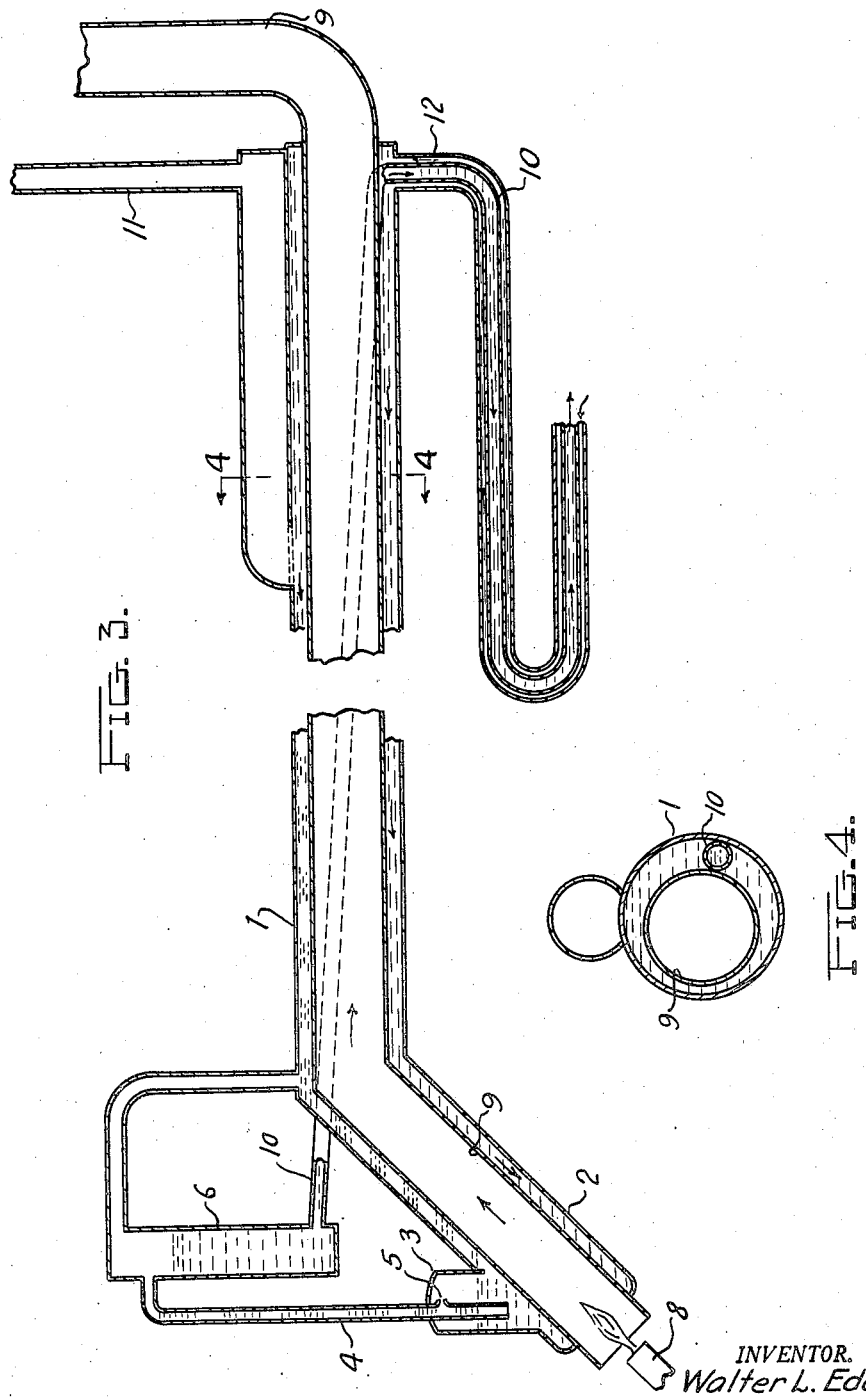

2,479,062

UNITED STATES PATENT OFFICE 2,479,062

GENERATOR, HEAT EXCHANGER, AND CIRCULATOR IN ABSORPTION REFRIGERATION SYSTEMS

Walter L. Edel, Detroit, Mich., assignor to Clayton & Lambert Manufacturing Company, Detroit, Mich., a corporation of Delaware Application April 15, 1946, Serial No. 662,145

9 Claims. (Cl. 62—119.5)

This invention relates to a generator and heat exchanger for continuous absorption refrigeration.

In continuous absorption refrigeration it is common to use heat exchangers between the rich and weak liquors flowing from the absorber and the generator, respectively, and it is also old to include heat exchange with the hot vapors from the generator. It is also old to provide a heat exchanger between the liquids and then pass the hot vapors from the generator and the separator in countercurrent through the incoming cool rich liquor in the heat exchanger.

I propose to combine such a heat exchanger with a boiler or generator and pass the hot vapor both from the separator and the generator through the incoming rich liquor in the boiler in countercurrents, thereby utilizing, as later explained, the maximum capacity of the heat from the products of combustion in vaporizing and separating the ammonia from the absorption solution.

The generator or boiler is utilized in triple capacity, namely, (1) to drive off the ammonia in vapor form, (2) as a quadruple heat exchanger between four fluids, to wit: the hot vapors, the hot weak liquor, the cold rich liquor and the products of combustion, and (3) as an analyzer. The hot vapors are driven through the cooler incoming rich liquors to separate the water vapor and recover the heat of condensation for use in the boiler.

My improvement affords a unit structure which saves not only space and structural units but has the greatest possible efficiency in utilizing the heat energy which is put into it.

In the drawings:

Fig. 1 is a longitudinal section of one form of the improved boiler, heat exchanger and analyzer.

Fig. 2 is a cross section of the same on the line 2—2 of Fig. 1.

Fig. 3 is a longitudinal section of a modified form of the invention.

Fig. 4 is a section on the line 4—4 of Fig. 3.

The preferred form of the boiler is a cylindrical shell 1 which is in the main horizontal but which has at the hot end an elbow-like portion 2 that extends downwardly at an angle. This elbow portion is provided with the usual steam dome 3 and the vapor lift 4 which has the vapor orifice 5. The vapor lift discharges into an elevated separator 6. The gas space of this separator connects by the down tube 7 with the boiler just beyond the elbow. The heat is provided preferably by a gas or oil burner 8 which is located at the entrance of the heating flue 9 that passes up through the center of the boiler. This flue may have a plain interior or may be provided with longitudinal fins to increase heat transfer. The lower end of the separator is connected with the boiler just in front of the elbow by means of a weak liquor tube 10 which passes through the jacket of the boiler at the side of the boiler. It will be seen from Fig. 2 that the boiler flue is eccentrically located in the boiler shell so as to provide the necessary space for the hot weak liquor tube 10. At the right-hand end of the boiler is located an upgoing vapor tube 11.

The cool rich liquor is fed into the right-hand or cool end of the boiler by means of a tube 12 and the hot weak liquor tube 10 passes down through the rich liquor tube 12 of the heat exchanger. This heat exchanger formed by the two liquor tubes 10 and 12 is made long enough so as to bring the rich liquor up to substantially the boiling point of the ammonia at the pressure and concentration maintained in the system. For instance, at a pressure of about 330 pounds per square inch and a 34% ammonia concentration, the boiling point is approximately 260° F. Hence, the heat exchanger is constructed or made of such length as to bring the rich liquor to the vaporizing point of the ammonia as it enters the cool end of the boiler. Hence, the rich liquor at this point is ready to give off its ammonia vapors to pass up through the vapor tube 11 to the condenser.

As the incoming rich liquors flow to the left and toward the hot end of the boiler, their temperature progressively increases not only by reason of the heat exchange relation with the hot products of combustion and the hot weak liquor but also by reason of the hot ammonia and water vapors passing counterwise through the rich liquor and the condensation of water vapor. More of the ammonia is progressively driven off and the ammonia concentration in the solution becomes weaker until at the left-hand or hot end of the boiler the liquor is comparatively weak, the ammonia concentration low. Here the weak liquor is elevated to the separator by the vapor pump. As the solution in the boiler is at a temperature sufficiently high to cause ammonia to be evaporated in all parts, no ammonia can be absorbed back in the water in any of the zones because of the concentration corresponding to the temperatures.

The purpose of the separator is to provide a liquid level elevated above the boiler liquid level to cause the hot weak liquor to flow back to the top of the absorber by gravity. The hot vapors passing off the top of the separator are both water and ammonia vapors. These hot vapors are directed into tube 7 and thence the hot vapors pass through the incoming cooler rich liquid in the boiler for imparting some of their heat to the rich liquor, thereby to aid the products of combustion in raising the temperature of the rich liquor to drive off the ammonia vapors. The passage of these vapors through the rich liquor is also for analyzing or condensing out the water vapors for recovering the water and also the heat liberated by such condensation. This analyzation in the boiler itself adds to the overall efficiency of the apparatus. None of the heat is lost as is the case where it is transmitted through conductors or heat exchanger devices back to the boiler where it can be put to useful work in generating the ammonia vapor.

Under the pressure and concentration conditions above given in the example cited, the heat of the weak liquors at the burner end of the boiler will be in the neighborhood of 400° F. These very hot weak liquors are then passed right back through the boiler jacket to lower the temperature of the weak liquors on their way back to the absorber where they must be relatively cool in order to properly absorb ammonia vapors from the evaporator. This is well understood, and heat exchangers have been provided between the hot and cool liquors but separate from the boiler. With my improvement a considerable part of the heat exchange takes place directly in the boiler or generator itself and there is saving of heat by not having such heat exchange taking place at a locality separated from the boiler and then conveying the recovered heat back to the boiler. It will be obvious that some heat will be lost in such an arrangement. By the arrangement shown it is possible to recover heat from the weak liquor to be cooled, and from the hot vapors passing through the strong liquor from the hot end to the cool end of the boiler, by transferring it at its highest temperature to the strong liquor at its correspondingly closest temperature. This insures the use of the heat transferred in its most effective and efficient manner thermodynamically in separating the ammonia in its most concentrated form from the strong liquor.

The weak liquor tube 10 running from the separator through the boiler and shown in Fig. 2 as 10 could be replaced by another annulus forming a jacket about the boiler tube 1. This would be effective in affording a larger surface for the transfer of heat from the weak liquor to the strong liquor. Wherever in the claims the weak liquor "tube" is recited in words I desire it to be understood that such an annulus around the boiler is included.

In the form of the invention shown in Fig. 3, the vapor tube connects with the boiler at a point some distance from the cooler end of the boiler. Then the vapor tube runs horizontally along with the boiler to the cooler end thereof in physical contact and heat exchange relation therewith. Hence, some of the water vapor attempting to pass out through the vapor tube is condensed in this horizontal run of the vapor tube which is in heat exchange relation with the boiler. In order to promote this condensation the incoming rich liquor is delivered into the cooler end of the boiler at a much lower temperature than is the case where the vapor tube leaves the extreme end of the boiler (Fig. 1). The outside heat exchanger will not be as long and the result will be that the rich liquor will not be heated up to the vaporization point but to a point considerably lower, say 150° F. Hence, the vapor tube will be able to be cooled by this rich liquor sufficiently to condense out most of the water vapor but not enough to condense the ammonia vapor. The heat exchange, generating and analyzation to the left of the vapor tube will take place in this form of the invention (Figs. 3 and 4) in the same way as with the modification shown in Figs. 1 and 2 of the drawings.

Ammonia vapors leaving the boiler pass through this upper vapor tube which is in heat conduction relation but out of physical contact with the cooler strong liquor entering from the right, thereby cooling the ammonia vapors to a greater extent, condensing water vapor, returning more of the heat in the vapor going into the condenser to the boiler by way of the strong liquor entering at the right. Any water vapor condensed out of the ammonia vapors in this special vapor tube will flood the bottom of this tube and travel to the left, where it mixes with the strong liquor passing to the hot end of the boiler. In so doing this water condensate passes through hotter and hotter zones tending to deplete it of absorbed ammonia vapor.

This type of construction is such as to absorb more heat in the strong liquor from the flue gas and from the vapor going to the condenser thereby causing the operation of the boiler to be more efficient and consume less fuel at the burner.

I claim:

1. In absorption refrigeration having liquid circulation between the absorber and the generator and generator and absorber by the aid of a lift and gravity, the combination of a boiler having a jacket and an internal heating flue, a heater at one end of the flue, a lift connected with the jacket at said end to elevate the hot weak liquors, a separator to receive such elevated liquors, means for conveying the hot weak liquor from the separator in heat exchange relation with the internal heating flue and the contents of the boiler jacket but out of physical contact therewith, means for introducing the cooler rich liquor from the absorber to the end of the boiler remote from the heater, means for conducting the hot vapors from the vapor space of the separator back to the interior of the boiler jacket to mix with the incoming rich vapors and to pass in countercurrent thereto toward the cooler end of the boiler and a vapor tube leading away from the boiler jacket at or near where the rich liquor first reaches the vaporizing temperature of the ammonia at the prevailing pressure and concentration.

2. The combination claimed in claim 1 in which the means for conveying the hot weak liquor from the separator in heat exchange relation with the contents of the boiler jacket is a tube passing from the separator into the boiler jacket and then therealong to the cool end of the boiler.

3. The combination claimed in claim 1 in which the boiler is an elbowed cylindrical shell with a substantially horizontal portion and having at the hot end a downwardly extending angular portion.

4. The combination claimed in claim 1 in which the boiler is an elbowed cylindrical shell with a substantially horizontal portion and having at the hot end a downwardly extending angular portion and in which the lift is a vapor lift with a dome located near the lower end of the angular portion of the boiler.

5. The combination claimed in claim 1 in which the boiler is an elbowed cylindrical shell with a substantially horizontal portion and having at the hot end a downwardly extending angular portion and in which the lift is a vapor lift with a dome located near the lower end of the angular portion of the boiler and the separator has a vapor tube leading from the vapor space to the boiler jacket substantially at or near the elbow of the boiler.

6. The combination claimed in claim 1 in which the boiler is an elbowed cylindrical shell with a substantially horizontal portion and having at the hot end a downwardly extending angular portion and in which the lift is a vapor lift with a dome located near the lower end of the angular portion of the boiler and the separator has a vapor tube leading from the vapor space to the boiler jacket substantially at or near the elbow of the boiler, the means for conveying the hot weak liquor from the separator being a tube leading from the lower end of the separator into the boiler at or near the elbow of the same.

7. The combination claimed in claim 1 and a separate heat exchanger between the hot weak liquor and the cool rich liquor connected with the cool end of the boiler, said heat exchanger having the capacity of elevating the temperature of the rich liquor entering the boiler to substantially the vaporization point of the ammonia solution at the prevailing pressure and concentration and the vapor take-off tube being located substantially at the cool end of the boiler.

8. The combination claimed in claim 1 and a vapor tube leaving the boiler at a point somewhat removed from the cool end of the boiler and paralleling and in heat exchange relation with the cooler end of the boiler.

9. The combination claimed in claim 1 and a vapor tube leaving the boiler at a point somewhat removed from the cool end of the boiler and paralleling and in heat exchange relation with the cooler end of the boiler and a heat exchanger independent of the boiler and between the weak and rich liquors and connected with the boiler at or near the cool end and having a capacity for delivering the rich liquor to the cooler end of the boiler at a temperature substantially lower than the boiling point of the ammonia at the prevailing pressure and concentration whereby heat exchange takes place between the vapors in the vapor tube and the cooler liquid in the cool end of the boiler and there is partial condensation of the water vapor in the vapor tube (rectification).

WALTER L. EDEL.

REFERENCES CITED

The following references are of record in the file of this patent:

UNITED STATES PATENTS

| Number | Name | Date |
| --- | --- | --- |
| 2,178,870 | Coons | Nov. 7, 1939 |
| 2,192,338 | Ullstrand | Mar. 5, 1940 |
| 2,201,362 | Bergholm | May 21, 1940 |
| 2,338,265 | Sherwood | Jan. 4, 1944 |
| 2,368,493 | Reistad | Jan. 30, 1945 |
| 2,422,401 | Gaugler | June 17, 1947 |